Feb. 11, 1941.　　　P. SUBKOW　　　2,231,231
PROCESS AND APPARATUS FOR CATALYTIC OPERATIONS
Filed Aug. 9, 1937
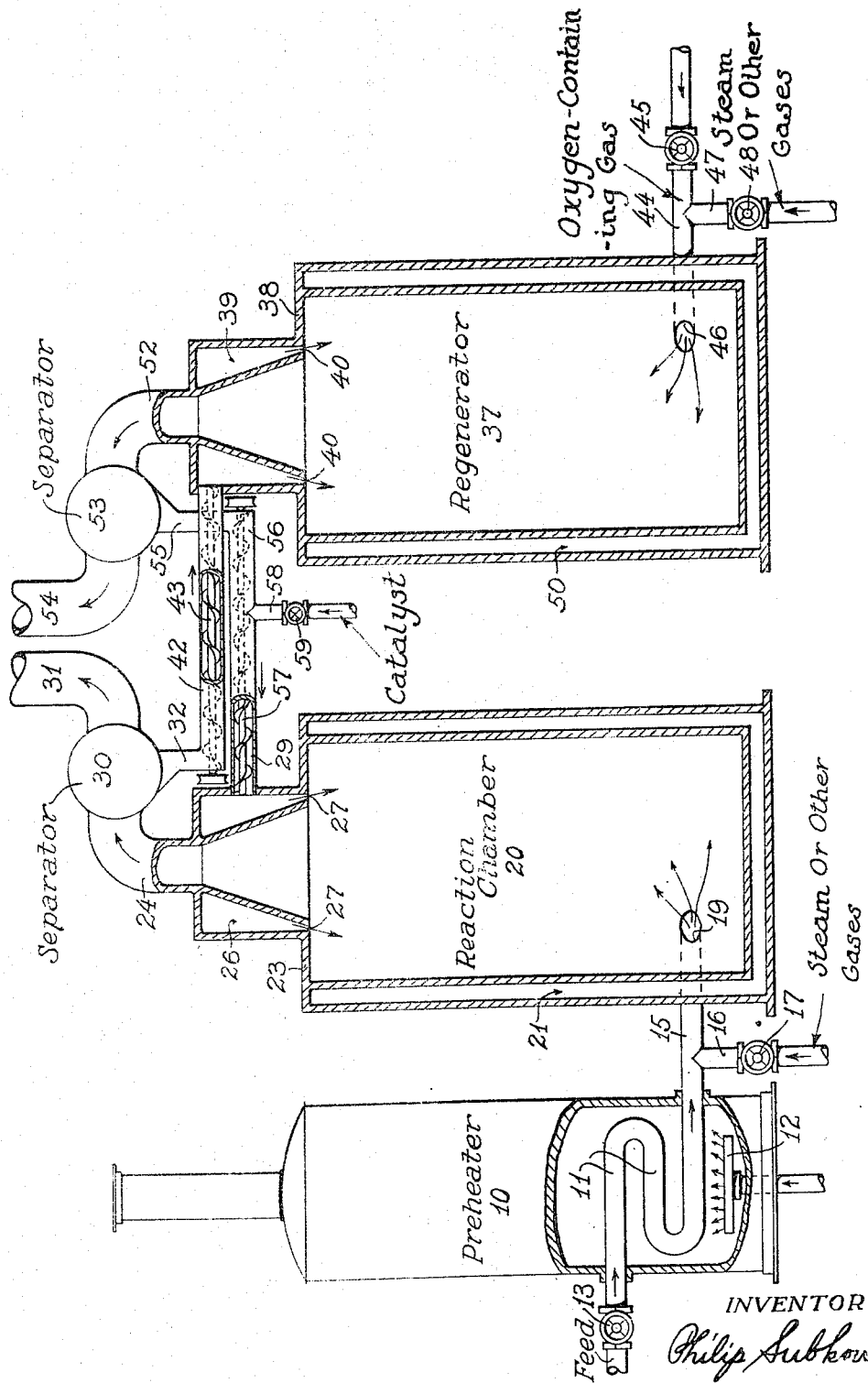
INVENTOR
Philip Subkow.

Patented Feb. 11, 1941

2,231,231

UNITED STATES PATENT OFFICE 2,231,231

PROCESS AND APPARATUS FOR CATALYTIC OPERATIONS

Philip Subkow, West Los Angeles, Calif., assignor to Union Oil Company of California, Los Angeles, Calif., a corporation of California Application August 9, 1937, Serial No. 158,166

9 Claims. (Cl. 196—10)

The invention relates to the general art of catalysis to effect chemical reactions, and more particularly to catalytic reactions of vapors and/or gases in contact with solid catalysts. More specifically, the present invention includes catalytic chemical reactions of the types of hydrogenation, dehydrogenation, polymerization and cracking of hydrocarbons, particularly petroleum hydrocarbons.

In ordinary catalytic chemical operations, the catalyst is customarily present as a catalyst mass in the form of lumps or granules arranged in beds or layers through which the vapors or gases pass. Due to the limited amount of contact surface available for purposes of reaction, only a portion of the catalyst is available for contact, a part being masked by the nature of the catalyst bed. Another limitation resides in the channeling in which the gases or vapors seeking the easiest route, pass through those parts of the bed which have the least resistance. Thus, only a portion of the catalyst is utilized. A still further limitation resides in the necessity of employing large amounts of catalyst in the bed since, as previously stated, only a portion of the catalytic bed is available for reaction purposes. The amount must also be increased above theoretical since the catalyst activity decreases with time, and the catalyst becomes spent. The amount of catalyst to be employed must be such that economic yields are obtainable even when the lowest activity of the catalyst has been reached. Another objection to the use of catalysts in the form of beds or layers is based on the fact that the use of such catalyst masses does not permit any control of the ratio of catalyst to vapors or gases treated except by varying the flow of the gases. Thus, the contact period in such cases may be controlled only by varying the velocity of the vapors or gases passing through said bed or layer, this control is only approximate because of channeling.

Furthermore, catalysts used in the treatment of petroleum hydrocarbons subjected to elevated temperatures are readily poisoned, that is become inactive either because of the formation of inert compounds, as when the catalyst reacts chemically with compounds, such as sulphur, present in the petroleum, or because of the coating of the catalyst with tar resulting from the cracking or polymerization of the petroleum vapors or gases treated.

The catalyst, when used in beds must be regenerated in the reaction zone itself by contact with air and sometimes steam. When used for the catalytic treatment of petroleum vapors or gases, the above regeneration step must be followed by a comparatively long steaming cycle to remove the air from the reaction chamber. Because of these limitations, catalytic treatments have been of the batch type.

It is one of the main objects of the present invention to avoid the above and other defects, and to provide an economical method and means for effecting superior contact between the catalysts and the materials upon which they are to act.

It is also one of the objects of my invention to provide a continuous method wherein the catalytic reaction is carried out in the presence of suspended catalysts, and wherein the spent or poisoned catalyst is continuously withdrawn from the reaction zone, regenerated, and then returned for further catalytic action on new quantities of material treated.

The objects of my invention are attained by effecting a continuous catalytic contact by commingling a granular or finely divided or pulverized catalyst with vapor or gases upon which the catalyst is to operate, causing said catalyst to be held in suspension in said vapor or gases by imparting thereto an optimum or sufficient velocity and/or turbulence, maintaining conditions to cause a catalytic reaction, and separating the catalyst from the products of reaction. The catalyst may be regenerated and re-commingled with new quantities of vapors or gases to be catalytically treated in cycles of operation.

The invention may be stated to reside in passing a stream of vapors or gases to be catalytically treated through a reaction zone, introducing a granular or finely divided or pulverized catalyst into the reaction zone in a direction opposite to that of the moving stream of vapors or gases, and removing said catalyst from said reaction zone together with the products of reaction.

The invention further resides in a process for the catalytic treatment of vapors or gases in reaction chambers, comprising continuously introducing a granular or finely divided or pulverized catalyst into said chamber, continuously introducing the vapors or gases to be treated into said chamber in a direction opposite to that of the catalyst, imparting to the vapors or gases sufficient velocity and turbulence to maintain the catalyst in suspension, and continuously removing the suspended catalyst from the reaction chamber together with the treated vapors or gases.

The invention still further resides in effecting catalytic reactions by continuously dropping the above-described catalyst into a reaction zone, conveying continuously through said zone, and in a direction opposite to that of the catalyst, the vapors or gases to be treated, imparting to said vapors or gases a velocity capable of maintaining the catalyst in suspension therein, causing the chemical reaction to occur, and withdrawing the catalyst and the treated vapors or gases from the reaction zone.

The invention still further includes the steps of separating the catalyst from the products of reaction, and regenerating said catalyst, thereby adapting it for use in further cycles of operation.

In order to obtain optimum conditions of operations in the reaction chamber, it may be desirable to control the rate of feed of the catalyst, as well as the rate or velocity of the vapors or gases passing through the reaction zone. These vapors or gases may be brought to the reaction temperature either before introduction into the chamber or in the chamber itself, or by both methods. Although the former is found most desirable in view of the possibility of maintaining accurate temperature control, as when these materials are preheated in tube stills, it is obvious that any other method of maintaining the vapors or gases at the optimum reaction temperature may be employed. In fact, with some types of catalytic reactions, and particularly those of the exothermic type, it may be advantageous and even necessary to provide cooling means, such as cooling coils, in the reaction chamber itself, to extract the excess heat generated therein during the reaction.

In one of its preferred forms, the vapors or gases may be introduced through or near the bottom of the reaction zone and be caused to move upwardly, and preferably spirally by introducing the gases or vapors into the chamber tangentially. The catalyst may be introduced into the upper portion of said chamber and caused to fall or move initially in a direction opposite to that of the upwardly flowing vapors or gases, the upward velocity of the vapors eventually causing the turning of the direction of flow of the catalyst so that the catalyst is withdrawn from the chamber together with the products of reaction. Also, depending on the specific gravity of the catalyst and the mass velocity of the vapors, the catalyst may be held suspended in the vapors for a period of time and eventually withdrawn with the vapors. Such movements insure a maximum duration of suspension of the catalytic particles in the reaction zone. The velocity of the upwardly moving stream of vapors or gases should be sufficient to keep the catalyst in suspension, and the rates of introduction of the catalyst and of the material to be treated are such that a proper ratio and an optimum contact period are obtained. For this purpose, it may also be found desirable to control the size of the catalyst particles so that they are substantially uniform. This will prevent vertical classification between catalyst particles, and permit control over the quantity of catalyst present at each instant in the reaction zone. Regulation of the ratio of the catalyst to material to be treated is thus obtainable. This control over the size of the catalyst particles may be accomplished as by a classification of the catalyst by screening so that the catalyst be of substantially uniform size.

The invention may be applied to catalytic processes wherein the gases or vapors to be treated, for instance cracked, polymerized, dehydrogenated, hydrogenated, alkylated, or otherwise reacted, depending on the material treated, the catalyst and other reacting gases employed, and the temperature, are continuously introduced into the lower portion of a reaction chamber or zone, and are caused to pass upwardly and, optionally, tangentially or spirally therethrough, while the granular or pulverized catalyst is introduced in a stream into the upper portion of the chamber and is projected downwardly and initially in a direction opposite to that of the upwardly moving material, the velocity of the gases or vapors being such as to maintain the catalyst in suspension and to cause the reaction products to remove the catalyst out of the reaction zone and into a separator from which the separated catalyst is removed, regenerated, and reconveyed back for further use in the catalytic treatment of new and further quantities of vapors or gases.

To aid the suspension of the catalyst in the vapors or gases, and for the purpose of removing the catalyst and the products of reaction from the reaction zone, the discharge conduit leading from said reaction zone may be provided with means adapted to create a suction at or near the discharge end of said reaction zone.

The above described continuous or batch reactivation of the spent or poisoned catalyst may be realized by employing the method and means similar to those used for the catalytic reaction itself. Thus, the spent catalyst may be introduced into a stream of heated air or oxygen, suspended therein, and reactivated while thus maintained in suspension. The invention, therefore, still further resides in the reactivation or regeneration of the spent or poisoned catalyst by continuously introducing said catalyst into a regeneration chamber or zone, introducing oxygen, air and/or steam, at optimum conditions of temperature, velocity and ratios to spent catalyst, into the chamber in a direction opposite to the initial motion of the catalyst, imparting to said regenerating medium a velocity sufficient to maintain the catalyst in suspension for a period of time sufficient to cause its reactivation, removing continuously the regenerated catalyst and said medium from the chamber, and separating the thus regenerated catalyst.

The details of the present invention will become more apparent from the following description with particular reference to the annexed drawing, the single figure of which is a diagrammatic view of an apparatus for carrying out a preferred embodiment of the invention.

Referring now to the drawing, the vapors or gases to be catalytically treated are preferably pre-heated to the optimum reaction temperature. For this purpose there is provided an ordinary still or pre-heater 10 which houses tubes 11 heated as by means of a burner 12. To regulate the rate of through-put of the gases or vapors, tubes 11 are provided with a valve 13. The rate of passage of the vapors where generated by distillation of petroleum oil may also be conveniently regulated by the control of the rate of distillation as will be well understood by those skilled in the art. The discharge end of tubes 11 communicates with line 15 provided with a branch line 16 carrying a valve 17. This line 16 is for the purpose of introducing, if and when desired, steam or other gases, such as an inert gas, or reacting gas, such as hydrogen as for instance when hydrogenation is to be accomplished, into the vapors or gases to be catalytically treated.

After passing through the above pre-heater 10, where they are raised to the desired temperature, the gases or vapors to be treated are then conveyed through line 15 and enter through opening 19 into the lower part of a vertical reaction chamber 20 which may be suitably insulated as by a jacket 21. For the purpose of causing a spiral or tangential upward movement of the substance to be treated, the position of pipe 15 is arranged and designed so that said opening 19 is substantially at a tangent to the reaction chamber 20. The upper end of this chamber is closed by a plate 23 which is provided with an axially disposed conduit 24 through which the products of reaction are removed from chamber 20. For the purpose of introducing the catalyst into the reaction chamber, plate 23 is further provided with a special catalyst injection head 26 which is disposed around conduit 24 and which communicates through an annular opening 27 with the interior of reaction chamber 20. The catalyst is supplied to head 26 through line 29. Conventional means for feeding solids may be employed. Such means form no part of this invention and their nature and use will be apparent to those skilled in the art. Annular opening 27 in injection head 26 may be designed so that the catalyst is initially projected or dropped spirally into said chamber in a direction opposite to that of the upwardly and spirally circulating gases or vapors. This may be realized by designing the injection head 26 so that its discharge annular opening 27 throws the catalyst spirally or tangentially in a direction opposite to the upward and spiral movement of the stream of vapors or gases being treated. These initially opposed movements insure a maximum duration of suspension of the catalyst particles in the reaction chamber. The fall of the particles through the chamber 20 is checked and complete sedimentation prevented by the upwardly circulating vapors or gases being catalytically treated. The inversion of direction of circulation of the gases and vapors with respect to the direction of circulation of the catalyst, as well as the relatively high velocity, turbulence and spiral motion of the gases and vapors, prevent the formation of gas jackets around the catalyst particles. This insures maximum contact of the gases and vapors with the catalyst and therefore a maximum efficiency. The products of reaction are removed from contact with catalyst as soon as they are formed.

By controlling the particle size of the catalyst, as well as the velocity and turbulence of the vapors, the catalyst may be held suspended in the vapors until finally withdrawn therewith from the reaction zone. The length of the chamber, the velocity of the vapors or gases, the amount of catalyst employed, and its size, must be regulated so that the vapors or gases are in the chamber for a period of time sufficient to effect the required reaction.

After leaving reaction chamber 20, the reaction products and the spent catalyst are conveyed through conduit 24 to a suitable separator 30. This withdrawal may be aided by providing conduit 24 with suction producing or generating means such as an exhausting fan preferably positioned on the exit side of separator 30. The separator may be of any suitable form such as a cyclone separator or a Cottrell electric precipitator. The separator is provided with a pipe 31 for the separate removal of the reaction products, and with a line 32 for the spent catalyst separated in said separator 30. The reaction products leaving through pipe 31 are conveyed for further treatment to any well known apparatus or structure not shown in the drawing in order to refine and separate the products into their several parts. Thus, these reaction products may be conveyed to coolers or condensers wherein the products may be liquefied with or without simultaneous separation of the reacted products from the unreacted vapors or gases. If the boiling points are different, the separation of the products of reaction from the mixture thereof with the unreacted products may be realized by distillation, if desired under a reduced pressure. In the alternative, such separation may be realized by a chemical treatment with a reagent or reagents which react with only one of said fractions or products. Obviously, the unreacted vapors or gases may be re-cycled back into the system together with fresh feed.

The regeneration or reactivation of the spent catalyst removed through pipe 32 may be by any one of the well known methods of regeneration, such as batch re-activation, for which purpose the catalyst may be collected and introduced into batch regeneration systems. I prefer, however, to regenerate the catalyst continuously. In the specific example here described this reactivation is carried out in a structure similar to the one employed for the catalytic reaction. For this purpose a vertical chamber 37 is employed. This chamber is provided with a top cover 38 carrying an injection head 39 of the type of injection head 26 on reaction chamber 20. As in that case, head 39 on regeneration chamber 37 is also provided with an annular opening 40 through which the spent catalyst, conveyed from pipe 32 through pipe 42 by any known means such as a screw conveyor 43, is dropped into said chamber 37 for purposes of reactivation. This is realized by contacting the spent catalyst with oxygen, air or stream. These gases or vapors are introduced into chamber 37 through line 44 equipped with a valve 45. Pipe 44 preferably opens tangentially into the bottom portion of chamber 37 as through opening 46. Line 44 is provided with a branch pipe 47 carrying a valve 48. This branch line is used when it is desired to add steam or a modifying or diluting gas, such as flue gas to the air introduced through line 44. Temperature control may be provided. Thus in the case of reactivation of a catalyst from petroleum catalysis it may be desirable to control the exothermic reactivation action by circulating a cooling medium through coils in chamber 37 (not shown) or through jacket 50. Instead of employing a jacket, tubular cooling coils may be provided in chamber 37 in which case insulation may be placed around chamber 37. The velocity of the activating medium introduced into chamber 37 should be such as to keep the spent catalyst in suspension and to remove the catalyst with the spent air, oxygen or steam. This withdrawal of the regenerated catalyst together with the reactivating medium may be further facilitated by providing discharge conduit 52 with any known means which will create an aspirating effect or suction in said conduit and in the upper portion of chamber 37, similar to that provided in conduit 24.

The catalyst conveyed upward by the stream of activating medium passes through conduit 52 and enters together with the air, oxygen or steam, into separator 53 which may be of any type similar to the above described separator 30. The catalyst thus activated is separated in 53 from the activating medium which is withdrawn from the system through line 54. The activated catalyst is then conveyed through line 55 into line 56 through which it is conducted as by means of a screw conveyor 57 to pipe 29 leading into injection head 26 on top of reaction chamber 20. Any new quantities of catalyst may be added through line 58 provided with a valve 59.

The operation according to the present invention is made continuous. The catalytic reaction in chamber 20 need not be interrupted for the purpose of regenerating the catalyst. The catalyst employed for the catalytic treatment in chamber 20 is separated from the products of reaction in separator 30, is then conveyed through lines 32 and 42 and injection head 39 into regenerating or reactivating chamber 37. After reactivation the reactivated catalyst is separated from the activating medium in separator 53 and is returned through lines 55, 56 and 29, into injection head 26 on top of reaction chamber 20. The reactivated catalyst may be re-used continuously for the catalytic treatment of further quantities of vapors or gases. The described method of reactivation permits of continuous withdrawal and regeneration of the catalyst. Catalysts of relatively short life may be employed since they are continuously removed and reactivated.

Various modifications in the details of operations are possible. Instead of preheating the gases or vapors before introduction into the reaction chamber, the heating may also be accomplished in the chamber itself. In such a case, it is possible to utilize the jacket 21, which may be provided with heating coils, or the chamber may be positioned within a furnace. Also, the heating coils may be positioned under chamber 20. In some cases, the heating coils may be arranged within the chamber itself, care being taken, however, not to obstruct the free flow of vapors and catalyst in the upper part of said chamber 20. Also, where operating on a combustible material such as petroleum vapors or gases, the vapors or gases may, upon entering chamber 20, be caused to be partially burned, as by regulated introduction of air along with these materials. This heats the remaining uncombusted material, the degree of heating being, as above indicated, regulated for example by the quantity of air injected through line 16 into the vapors or gases.

Instead of introducing the oil vapors or gases through opening 19 and burning a portion thereof, hot combustion gases, as for instance, furnace gases formed in a separate combustion chamber, may be commingled with the vapors or gases to be catalytically treated, and then introduced together as a stream into the reaction chamber. In the alternative, these combustion gases may be separately introduced through one or more openings or ports similar to 19 and positioned at some point or points near said opening 19 through which the vapors or gases to be treated are being simultaneously injected. Such an arrangement permits the vapors or gases to be commingled in chamber 20 with the combustion gases and to be heated thereby to the proper reaction temperature while the mixture is rising upwardly through chamber 20. Furthermore, separate introduction of the materials to be treated and of the hot combustion gases results in the maintenance of the desired turbulence and velocity in the reaction chamber thereby bringing the catalyst into more intimate contact with the materials being treated.

The number of openings, similar to 19, through which vapors or gases are introduced into chamber 20, may be controlled at will. These openings may be arranged in a single horizontal plane, or may be disposed at various points along the vertical walls of the reaction chamber. This permits accurate control of the velocities and volumes of vapors at various places in the chamber, and the regulation of the catalyst-vapor ratio within the reaction chamber. Inert gas may be mixed with the vapors to be treated, this commingling being made either in line 15 or within chamber 20 (as by introducing said inert gas through a separate opening or openings similar to 19). In the case of exothermic catalytic reactions, the introduction of an inert gas at some point intermediate opening 19 and discharge conduit 24 will dilute the materials being treated, or, if the introduced inert gas is precooled, will absorb some of the heat generated, thus tempering the reaction rate.

Vapors or gases to be treated as from line 58 may be commingled with the catalyst in line 29, and be then projected from head 26, through annular opening 27, into reaction chamber 20 against an upwardly moving stream of vapors or gases, such as materials undergoing reaction or an inert gas as for instance combustion gases. By controlling the initial catalyst velocity as by regulating the pressure of the gas introduced into conduit 29, it is possible to regulate the degree and rate of reaction. Thus, for any given rate of upward travel of the vapors or gases being treated, an increase or decrease in the initial downward velocity imparted to the catalyst correspondingly changes the depth to which the catalyst penetrates into reaction chamber 20 and before its direction of travel is checked and it is picked up and carried out of the chamber by the upwardly moving stream from opening 19. There are thus two streams: one of which is traveling downward near the walls of the chamber, while the other comprises a central core of upwardly moving gases. At the point where the catalyst is picked up and moved upwardly, there is a relatively turbulent zone, the catalyst being held in suspension. The counterflow increases the period of time during which each catalyst particle remains in the reaction zone, and also varies the zone of maximum turbulence where the above change in direction of flow of the catalyst occurs.

As an example, chromium hexacarbonyl may be heated to 200° C. or higher, in vapor phase, whereby the chromium hexacarbonyl is decomposed into catalytically active $Cr_2O_3$, chromium and carbon monoxide, with the $Cr_2O_3$ and the chromium suspended in the CO as a fine dust. It may be desirable to increase the amount of gas to insure adequate suspension of the $Cr_2O_3$ and the chromium, for which purpose the mixture may be diluted with additional carbon monoxide, nitrogen, flue gases, or the like. Such a dust mixture, with or without said dilution, may be introduced through head 26 and annular opening 27 into reaction chamber 20 in counterflow relation with hydrocarbon vapors or gases to be catalytically treated introduced through opening 19, or such dust mixtures, combined with hydrocarbon vapors or gases from line 58, may be so introduced from head 26 and opening 27 to chamber 20 and contacted with heated combustion gases or the like from heater coil 11 and opening 19, which gases at the same time will serve to effect any required dilution. Again, this dust mixture may be passed with a mixture of oxygen and hydrocarbon vapor from line 58 to the reaction chamber 20 where partial oxidation of the hydrocarbon may be catalytically effected. Thus, the preparation of the catalyst from organic intermediates (such as the mentioned chromium hexacarbonyl, or chromium tri-ethyl, di-hydroxy chromium ethyl, phenyl chromium hydroxide, or the like) may be effected as a gas-borne dust, as a vapor, as a vapor-deposited decomposition product, as a solute, as a material formed in situ, as a material formed in situ from its organic and inorganic components, and so on, through many other modifications that become possible when an organo-metallic compound is used as an intermediate. Thus, not only may these gas-borne dusts be formed co-incidentally with or in the presence of suspending gases, such as carbon monoxide or flue gases, but they may also be formed in situ in the hydrocarbons or other gases or vapors to be treated.

As previously stated, cooling means, such as coils, may be provided either within the chamber itself or in the insulating jacket 21, the use of such coils being especially necessary when the catalytic reactions performed are of the highly exothermic type.

It is desirable to control the size of the catalyst particles. For this purpose the catalyst may be screened, and the particles of relatively uniform screen size employed. Thus, as a non-limiting example, and where a relatively coarse catalyst is found to be satisfactory, it may be found advantageous to use a catalyst which passes through a 10 mesh screen but is retained on a 20 mesh. On the other hand, when dealing with finely divided catalyst, the fraction passing through a 100 mesh and retained on a 200 mesh screen may be used. Also, catalysts passing through a screen having a mesh as high as 300 may, in some instances be found to give particularly desirable reaction rates. In other words, the screening of the powdered or crushed catalyst, and the use of the particles which have a fairly uniform particle size, is advantageous since it permits the maintenance of the catalyst in suspension without allowing it from either falling to the bottom of the reaction chamber, or from being blown out prematurely through the discharge conduit.

The method and apparatus herein described is a general tool for catalytic processes, especially useful for the catalytic treatment of vapor or gases in contact with solid catalysts. It finds a particular usefulness in the catalytic conversion of petroleum hydrocarbons. Thus, it may be used for the hydrogenation of petroleum hydrocarbons of such boiling ranges as may be conveniently vaporized. For example, the process is applicable for the hydrogenation of unsaturated hydrocarbons, such as di-iso-butylene to form iso-octane. The saturation of aromatic and unsaturated hydrocarbons may also be realized. The process and apparatus are also applicable to that form of hydrogenation, known as destructive hydrogenation, in which petroleum hydrocarbons are heated at an elevated temperature in the presence of hydrogen to convert lubricating oils of low viscosity index into oils having a high viscosity index. Similarly, the cracking of gas-oil to form high octane gasoline, and the conversion of low octane gasolines into high octane gasolines, are also included in the process known as "destructive hydrogenation" because they include a cracking or conversion in the presence of hydrogen and of a hydrogenation catalyst.

Unsaturated gases, such as butylene and propylene, obtainable as by-products during the stabilization of pressure distillates derived from cracking, may be polymerized by the above method. Obviously, a suitable catalyst should be used. By employing mixtures of unsaturated hydrocarbons, such as ethylene, propylene and butylenes, both of the straight chain and iso varieties, in admixture with ethane, propane or butane, or other saturated hydrocarbons, particularly those having a tertiary hydrogen atom, it is possible to realize alkylation reactions.

The higher boiling members of the hydrocarbon series may be cracked or dehydrogenated. Thus, gasoline may be increased in octane rating by passing the gasoline vapors in contact with a proper catalyst, whereby the aromatic content may be increased. This results in a gasoline of a higher knock rating.

The process is also applicable to the cracking of gas-oil to form high octane gasoline. In such a case the gas-oil vapors are brought in contact with catalysts which aid such cracking reactions.

As an example, if the above process is to be used for dehydrogenation of iso-butane or of mixtures of iso-butane and of propane, this material may be first heated in pre-heater 10 to a temperature of, for example, from 800° F. to 900° F., and then introduced through line 15 into the reaction chamber 20. The upwardly moving stream of heated hydrocarbon is now brought in contact with the catalyst introduced through the annular opening 27. As such catalyst or catalysts, it is possible to use various oxide or hydrous oxide gels, particularly as prepared by dehydration of the corresponding hydroxide gels. As non-limiting examples, these catalysts include chromium oxide alone or with the oxides of thorium, zirconium or aluminum, zinc oxide in combination with oxides of aluminum, titanium, thorium or zirconium, and oxides of copper and barium with the oxides of aluminum, titanium, thorium or zirconium. Obviously, other dehydrogenation catalysts may also be employed. The ratio of catalyst to hydrocarbon is controlled to obtain optimum results, the velocity of the heated hydrocarbon being such that the catalyst is maintained in suspension and is removed, together with the products of reaction, through conduit 24 to separator 30. The catalyst is then separated, withdrawn and regenerated in chamber 37 with hot air, and may then be returned to chamber 20 in cycles of operations. As to the products of reaction leaving separator 30, they may be treated in any well known manner for the separation of iso-butylene and propylene, or of either of these substances, as well as of the other products of dehydrogenation of the original material. The unconverted fraction of hydrocarbon used may be re-cycled for further dehydrogenation.

It is obvious that the process is not limited to the dehydrogenation of iso-butane or propane, but is equally applicable to the dehydrogenation of other hydrocarbons, such as paraffinic hydrocarbons of the type of ethane, n-butane and hexane, of unsaturated hydrocarbons, such as ethylene to form acetylene, etc., and, in fact, of any of the hydrocarbon fractions, including petroleum fractions, which undergo thermal decomposition with the evolution of hydrogen. It is also clear that, depending on the material to be dehydrogenated, the operating temperature, pressure, ratio of catalyst to material treated, as well as the type of catalyst itself, might have to be somewhat varied or modified. However, these facts being within the knowledge of those skilled in this art, the application of the present process and apparatus to the dehydrogenation of the above and other substances should be construed as falling within the scope of my invention.

The same process and apparatus could be employed for catalytic polymerization of unsaturated hydrocarbons, such as butylene, or isobutylene and propylene present in cracking still gases. For this reaction the gases are preheated to a temperature of about 450° F., the treatment being realized under a pressure of approximately 200 pounds per square inch maintained in the reaction chamber. The upward velocity of the gases through the reaction chamber is realized by maintaining the proper pressure drop between the inlet opening 19 and the discharge conduit 24. It is obvious that the invention is not limited to any specific temperature or pressure given herein, nor to any catalyst mentioned. As such catalysts for the above-mentioned polymerization, it is possible to use substances of the type of cadmium acid phosphate, some of the tri-valent metallic halides, such as ferric or aluminum chlorides, various acids, such as sulphuric or phosphoric acids (introduced to form a mist in the gas), phosphoric acid salts, and various aluminum hydro-sulfates or aluminum hydro-silicates, whether natural or artificial. The catalytic polymerization may be used, for example, to convert iso-butylene into di-isobutylene which may then be hydrogenated to produce the valuable iso-octane.

This hydrogenation may be accomplished by introducing the preheated di-isobutylene into a reaction zone, such as herein described, together with hydrogen. The catalysts usually employed for catalytic dehydrogenation are equally applicable to hydrogenation operations. Also, catalytic nickel as well as metals of the iron and platinum groups are suitable for this purpose. The operating conditions are, however, different from those employed during dehydrogenation. Thus, optimum hydrogenation temperatures are usually in the neighborhood of 300° F. to 400° F., and greater yields are obtainable when the reaction is conducted at superatmospheric pressures. In some instances it is advisable to employ equivalent molecular quantities of the vapors and of hydrogen, while in other cases the presence of an excess of hydrogen may be found desirable. Obviously, the hydrogenation of other unsaturated hydrocarbons and petroleum fractions may be realized by commingling said substance with hydrogen, bringing the mixture to the optimum reaction temperature and pressure, and injecting this mixture into the chamber 20 wherein the mixture picks up and holds in suspension the catalyst introduced through the annular opening 27. The products of reaction and the catalyst then pass to separator 30 from which the products of reaction are conveyed to any apparatus for the recovery of the hydrogenated product. The spent catalyst, after regeneration as aforesaid, is returned for further use in cycles of operation.

Conversion or reforming of gasoline to increase its knock rating, that is increasing the iso-octane value of the gasoline, may be considered to combine dehydrogenation and other reactions, such as molecular rearrangement. As previously stated, this reforming may be accomplished according to the present process, the preferred catalysts in this case including all of the oxide catalysts employed for dehydrogenation as well as the oxides of chromium, molybdenum, tungsten, the various metallic salts of the more acidic metallic oxides and the hydrated aluminum silicate. The catalytic reforming may be carried out on both paraffinic and naphthenic gasolines, the knock rating increasing in both cases.

As an example a paraffinic gasoline, such as for instance produced from Midcontinent crudes, or, preferably, the gasoline raffinate produced by sulphur dioxide extraction of a naphthene base distillate may be reformed by preheating the raffinate to a temperature of between 950° and 1050° F. and by conveying the vapors thus produced at substantially atmospheric pressure through the reaction chamber wherein the vapors are brought in contact with a catalyst which in this case may be a mixture containing chromium and tungsten oxides. In some cases the gasoline vapors may be diluted or commingled with an inert carrier gas. The products of reaction comprise a small percentage of saturated and unsaturated gaseous substances, the bulk of the reaction products comprising the liquid having substantially the same boiling point range as the gasoline treated, but a considerably higher content in aromatics and unsaturates. Thus, whereas the gasoline subjected to the reforming contains substantially no aromatics or unsaturates the products of reaction may contain as much as 25% aromatics and 30% unsaturates. If a naphthene base oil fraction, such as a gasoline produced for example from a naphthene base crude oil from the California San Joaquin Valley oil field, is subjected to the above described reforming, the percentage of aromatics produced may be such that it may be profitable to extract the aromatics from the products of reaction. This may be accomplished by solvent extraction with or without subsequent polymerization to remove olefines and other unsaturated hydrocarbons. Obviously, the reforming operation may be performed on pure naphthenes, the resulting products containing aromatics with little or no unsaturated olefinic hydrocarbons.

As stated, the process described herein is equally applicable to destructive hydrogenation of substances such as gas oils or gasoline. The catalysts employed in this case include metallic oxides and molybdenum sulphide. For such destructive hydrogenation the material to be treated as, for example, the above mentioned gas oil or gasoline, is heated to temperatures between 700° and 1100° F. or even higher and conveyed through the reaction chamber, together with the necessary or optimum quantities of hydrogen, at pressures as high as 300 atmospheres. As in the previous cases the catalyst is conveyed into the reaction chamber in the described manner so that it will be suspended in the material under treatment. The mixture is then withdrawn to separator 30 from which the spent catalyst is conveyed to the reactivating chamber, and then recycled back to reaction chamber 20.

The process is equally applicable to catalytic vapor phase cracking. This operation is usually carried out at temperatures in the range of 900° F. and 1100° F. and at atmospheric or only slightly superatmospheric pressures. The material to be treated, which may be any suitable petroleum fraction, such as gas oil, after preheating to the above temperatures, is conveyed through line 15 into the reaction chamber 20. In its upward movement through the reaction chamber the vapors are brought in contact with the catalyst introduced through annular opening 27. As such catalyst it is possible to use ferrous oxide, silicates, either alone or impregnated with small percentages of nickel or cobalt, or chromium or nickel alloys containing small proportions of silicon, zinc, iron, aluminum, molybdenum, or titanium; alumino-silicates, with or without other metallic oxides, may also be used. As in the previous cases, the ratio of catalyst to the vapors to be cracked is controlled to obtain optimum results. The velocity is also maintained so that the catalyst is held in suspension and is removed together with the products of reaction through conduit 24. After separation the spent catalyst may then be regenerated in chamber 37 and returned to reaction chamber 20 in cycles of operation.

The process is also applicable to the refining of gasoline having a high sulphur or gum forming content. The process of destructive or simple hydrogenation, as herein described, will prove effective for the removal or conversion of these bodies. Good results may also be obtained by heating such gasoline in contact with hydrated aluminum silicate containing precipitated nickel or partially reduced nickel oxide, such as described in U. S. Patent No. 2,078,247, issued to Eugene J. Houdry on April 27, 1937.

From what was said above, it will be seen that the process and apparatus are applicable to a wide variety of catalytic reactions.

While the process has been described as applicable to solid granular or powdered catalysts, it is also possible to employ liquid catalysts, such as sulphuric acid used in polymerization reactions. In this case, the liquid catalyst is sprayed into the stream in a direction opposite that of the flow of the gases, the catalyst mist or spray functioning in the same way as a solid powdered catalyst.

It is to be understood that the present invention is not to be limited to the particular details or exemplifications presented hereinabove, but is to be limited only by the appended claims.

I claim:

1. In a method for the catalytic treatment of vapors and gases, the steps of introducing a granulated catalyst into a reaction zone, simultaneously conveying through said zone a stream of the material to be treated in a direction opposite to that of the introduced catalyst, and imparting to said stream of material a velocity sufficient to maintain the catalyst in suspension during the treatment step and to withdraw said suspended catalyst from the reaction zone together with the catalytically treated material.

2. In a method according to claim 1, wherein the size of the catalyst particles introduced into the reaction zone is substantially uniform, thereby preventing classification of said catalyst in said zone.

3. A method for the catalytic treatment of vapors and gases which comprises introducing a catalyst in a divided state into a reaction zone, introducing a stream of the material to be treated into said zone in a direction opposite to that of the catalyst, causing the catalyst to become suspended in said stream of material, simultaneously causing the catalytic reaction to occur whereby the catalyst becomes at least partially poisoned and inactive, removing the products of reaction together with the suspended catalyst out of the reaction zone, and separating said poisoned catalyst from the products of reaction.

4. An apparatus for catalytic treatment of vapors and gases, which comprises a reaction chamber, means to introduce the vapors and gases tangentially into said chamber, means adapted to introduce a granulated catalyst into the reaction chamber in an initial direction opposite to the path of the gases and vapors passing through said reaction chamber, means to withdraw the products of reaction and the catalyst from said chamber, means for separating the used catalyst from said mixture, a catalyst regenerating chamber, means communicating with said chamber and with the catalyst separating means adapted to introduce said catalyst into said regenerating chamber, means to introduce a stream of a reactivating medium into and through said chamber, said stream suspending the introduced spent catalyst, means for withdrawing the reactivated catalyst and the reactivating medium from said regenerating chamber, means for separating the reactivated catalyst from said medium, and means adapted to reconvey said separated and regenerated catalyst to the means introducing the catalyst into the reaction chamber.

5. A method for dehydrogenation of hydrocarbons selected from the group consisting of ethane, propane, butane, hexane, ethylene and paraffinic and unsaturated petroleum fractions, which comprises heating said material to an elevated temperature, conveying said heated material in a stream through a reaction zone, introducing into said reaction zone in a direction opposite to that of the stream of material to be treated a granulated dehydrogenation dehydration catalyst, imparting to the material to be dehydrogenated a velocity sufficient to maintain the catalyst in suspension therein, simultaneously causing the catalytic dehydrogenation to occur in said reaction zone whereby the catalyst becomes poisoned and at least partially inactive, withdrawing the mixture from the reaction zone, and separating the poisoned catalyst from the dehydrogenated material.

6. A method for the catalytic reforming of petroleum hydrocarbon fractions to increase their knock rating which comprises preheating said fractions to an elevated temperature, conveying said material in the form of a vapor stream through a reaction zone at a rate sufficient to effect the required reaction, simultaneously introducing into said reaction zone in an initial direction opposite to that of the moving stream of vapors, a granulated dehydrogenation catalyst, causing the catalytic reaction to occur whereby the aromatic and unsaturated content of the vapors is increased and whereby the catalyst becomes at least partially inactive, removing the reaction products and the catalyst as a commingled stream from the reaction zone, separating said spent catalyst from the reaction products.

7. In a process according to claim 6 wherein the hydrocarbon vapors to be reformed are commingled with an inert carrier gas prior to their introduction into the reaction zone.

8. A method for the catalytic polymerization of unsaturated hydrocarbons which comprises heating said unsaturated hydrocarbons to an elevated temperature, conveying said heated unsaturated hydrocarbons in a stream through a reaction zone, introducing a granulated polymerizing catalyst into said reaction zone in a direction opposite to that of the stream of hydrocarbons to be treated, imparting to the material to be treated a velocity sufficient to maintain the catalyst in suspension therein, simultaneously causing the catalytic polymerization to occur in said reaction zone whereby the catalyst becomes poisoned and at least partially inactive, withdrawing the mixture from the reaction zone and separating the poisoned catalyst from the polymerized material.

9. A process for the catalytic vapor phase cracking of petroleum hydrocarbons which comprises heating said material to a cracking temperature to form a vapor, conveying a stream of said vapors through a reaction zone, simultaneously introducing a cracking catalyst into said reaction zone in a direction initially opposite to that of the moving stream of vapors, causing the catalytic reaction to occur, removing the reaction products and the catalyst as a commingled stream from the reaction zone and separating the catalyst from the products of reaction.

PHILIP SUBKOW.